(12) United States Patent
Overend et al.

(10) Patent No.: US 7,780,279 B2
(45) Date of Patent: Aug. 24, 2010

(54) RADIATION-CURABLE INKS

(75) Inventors: Andrew Stuart Overend, Manchester (GB); Adrian Peter Bisson, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 751 days.

(21) Appl. No.: 10/576,766

(22) PCT Filed: Oct. 19, 2004

(86) PCT No.: PCT/GB2004/004402

§ 371 (c)(1), (2), (4) Date: Nov. 13, 2006

(87) PCT Pub. No.: WO2005/044937

PCT Pub. Date: May 19, 2005

(65) Prior Publication Data

US 2007/0142493 A1    Jun. 21, 2007

(30) Foreign Application Priority Data

Oct. 23, 2003 (GB) .................... 0324749.1

(51) Int. Cl.
*C09D 11/10* (2006.01)
*B41J 2/175* (2006.01)
*B05D 1/32* (2006.01)

(52) U.S. Cl. ............. 347/86; 522/71; 522/75; 522/83; 522/182; 522/173; 523/160; 427/466

(58) Field of Classification Search ........... 523/160; 522/74, 83, 182, 71, 75, 173; 427/466; 347/86
See application file for complete search history.

(56) References Cited

U.S. PATENT DOCUMENTS

| | | | |
|---|---|---|---|
| 4,164,423 A | 8/1979 | Schumacher et al. ......... 106/20 |
| 5,190,582 A | 3/1993 | Shinozuka et al. ......... 106/20 D |
| 5,275,646 A | 1/1994 | Marshall et al. .......... 106/20 B |
| 5,306,739 A | 4/1994 | Lucey ........................ 522/42 |
| 5,538,548 A | 7/1996 | Yamazaki ................. 106/20 C |
| 5,686,508 A * | 11/1997 | Shimomura et al. ......... 523/161 |
| 5,712,022 A | 1/1998 | Tanaka et al. ............... 428/195 |
| 5,747,562 A | 5/1998 | Mahmud et al. ............ 523/215 |
| 5,840,106 A * | 11/1998 | Krepski et al. .............. 106/506 |
| 5,919,294 A | 7/1999 | Hirasa et al. ............... 106/31.9 |
| 6,114,406 A | 9/2000 | Caiger et al. ............... 522/121 |
| 6,245,832 B1 * | 6/2001 | Suzuki et al. ............... 523/160 |
| 6,310,115 B1 | 10/2001 | Vanmaele et al. ............ 522/25 |
| 6,395,805 B1 * | 5/2002 | Takao ........................ 523/205 |
| 6,402,825 B1 * | 6/2002 | Sun ........................... 106/473 |
| 6,417,283 B1 * | 7/2002 | Ikeda et al. ............... 525/326.1 |
| 6,475,683 B1 | 11/2002 | Kashiwazaki ................. 430/7 |
| 6,534,128 B1 | 3/2003 | Carlson et al. ............. 427/466 |
| 6,550,906 B2 | 4/2003 | Ylitalo ...................... 347/102 |
| 6,558,753 B1 | 5/2003 | Ylitalo et al. ............... 427/466 |
| 6,593,390 B1 | 7/2003 | Johnson et al. ............... 522/74 |
| 6,727,295 B2 | 4/2004 | Laksin et al. ............... 523/160 |
| 6,994,745 B2 * | 2/2006 | Hoshida et al. .......... 106/31.85 |
| 7,001,936 B2 * | 2/2006 | Akers et al. ................. 523/161 |
| 7,135,504 B2 * | 11/2006 | Yamada et al. ............... 522/71 |
| 7,278,726 B2 * | 10/2007 | Nagai ........................ 347/100 |
| 2002/0086914 A1 | 7/2002 | Lee et al. ..................... 522/75 |
| 2002/0122106 A1 | 9/2002 | Ylitalo ...................... 347/102 |
| 2003/0083396 A1 | 5/2003 | Ylitalo et al. ................. 522/74 |
| 2003/0158283 A1 | 8/2003 | Ylitalo et al. ................. 522/74 |
| 2003/0158286 A1 | 8/2003 | Nishizaki et al. ............ 522/168 |
| 2003/0199612 A1 * | 10/2003 | Nakajima ................... 523/160 |
| 2005/0160938 A1 * | 7/2005 | Moudry et al. ........... 106/31.87 |

FOREIGN PATENT DOCUMENTS

| | | |
|---|---|---|
| EP | 0 588 533 A2 | 3/1994 |
| JP | 7-31640 | 12/1995 |
| JP | 10-251575 | 9/1998 |
| JP | 11-005933 | 1/1999 |
| JP | 2000-290548 A | 10/2000 |
| JP | 2003-253155 | 9/2003 |
| JP | 2002-179967 | 6/2006 |
| WO | WO 00/31189 | 6/2000 |
| WO | WO 02/46322 | 6/2002 |
| WO | WO 03/027162 | 4/2003 |

* cited by examiner

*Primary Examiner*—Susan W Berman
(74) *Attorney, Agent, or Firm*—Morgan Lewis & Bockius LLP

(57) ABSTRACT

Non-aqueous, radiation-curable inks comprising pigment, dispersant and a liquid carrier, wherein the pigment has an acid value greater than 8 mg of NaOH per gram of pigment. The inks are particularly suitable for use in ink jet printers.

14 Claims, No Drawings

RADIATION-CURABLE INKS

This invention relates to non-aqueous radiation curable inks and to their use in ink jet printing.

Ink jet printing is a non-contact method by which droplets of ink are ejected through a fine nozzle onto a substrate. There are many demanding performance requirements for inks used in ink jet. For example they are required to pass through the fine ink jet nozzles without blocking them. They desirably provide sharp, non-feathered images having good water-, solvent- light- and ozone-fastness, attractive colour and high optical density. Further desirable properties for ink jet printing inks include a fast dry time (to facilitate high-speed printing), a low viscosity to enable the inks to be used in a wide range of ink jet printers, excellent mechanical resistance (to avoid the prints being rubbed off), low curl and good adhesion to a range of substrates.

Ink jet printing inks typically used in home and office ink jet printers are typically aqueous and contain organic solvents. While these inks have acceptable performance when printing on absorbent substrates such as paper, they are not of much use for printing non-absorbent substrates such as metals or plastics. Furthermore the dry times of conventional aqueous ink jet inks, and even solvent-based ink jet inks, can be rather long. The resultant images can suffer from poor rub-fastness and light-fastness (often due to the presence of dyes rather than pigments). Solvent-based inks have the disadvantage of releasing volatile organic chemicals into the atmosphere and creating malodours or fire hazards in confined areas lacking adequate ventilation.

According to the first aspect of the present invention there is provided a non-aqueous, radiation-curable ink comprising pigment, dispersant and a liquid carrier, wherein the pigment has an acid value greater than 8 mg of NaOH per gram of pigment.

Preferably the pigment has covalently attached acidic groups, e.g. carboxy, phosphato and/or sulpho groups, especially carboxy groups.

Preferably the pigment has a pH below 7.

The acid value of the pigment is preferably greater than 9, more preferably greater than 10, especially greater than 12 mg of NaOH per gram of pigment. In one embodiment the acid value is up to 40 mg of NaOH per gram of pigment.

The acid value of the pigment is the number of milligrams of sodium hydroxide required to neutralise the 1 g of pigment. This may be measured by a number of methods, preferably by suspending 5 g of the pigment in 50 cm$^3$ of 0.1M sodium hydroxide solution, sonicating the suspension for 30 minutes at 25° C., removing the pigment by filtration and titrating 25 cm$^3$ of the filtrate using 0.05M sulphuric acid to a pH of 7.0 according to a glass electrode pH meter, wherein the acid value is calculated by the following equation:

acid value=(40−(1.6×(volume in cm$^3$ of 0.05M sulphuric acid titrate required to achieve the pH of 7.0)) mg of NaOH per gram of pigment.

For example, 12.5 cm$^3$ of 0.05M sulphuric acid titrate shows the pigment had an acid value of 20 mg of NaOH per gram of pigment. 5 cm$^3$ shows the pigment had an acid value of 32 mg of NaOH per gram of pigment. If the pigment is expected to have an acid value above 40 this may be measured using the same method described above except that less than 5 g of pigment is used (e.g. 2.5 g or 1.25 g and so forth) and the equation is modified in proportion to the reduction in pigment weight (e.g. doubling, quadrupling and so forth).

The pH of the pigment may be determined by sonicating 10 parts of the pigment in 100 parts of deionised water for 30 minutes then measuring the pH of the water using a glass electrode pH meter, wherein all parts are by weight.

Preferably the pigment has a pH of less than or equal to 6, more preferably less than or equal to 5, especially less than or equal to 4.

The amount of pigment in the ink is preferably 0.1 to 14%, more preferably 1 to 10% and especially 1.1 to 8% by weight, relative to the total weight of the ink. Preferred pigments are yellow, magenta, cyan, black, blue, indigo, violet, green, orange or red and mixtures comprising two or more thereof. Preferably the ink is free from titanium dioxide.

The pigment is preferably a carbon black pigment, more preferably a carbon black pigment having a BET surface area of 50 to 400 m$^2$/g, more preferably 100 to 300 m$^2$/g. The BET surface area may be determined by ISO 4652.

Carbon black pigments with an DBP absorption of 50 to 200 ml/100 g, more preferably 60 to 170 ml/100 g, especially 80 to 140 ml/100 g, more especially 165 to 115 ml/100 g are preferred due to their wetting properties DBP absorption may be measured by JIS (Japanese Institute of Standards) method K6221.

The pigment is preferably in the form particles which are small enough to pass through the very fine nozzles used in the printheads of ink jet printers. Typically these nozzles are half the diameter of a human hair. Thus the average particle size of the pigment is preferably 14 to 120 nm, more preferably 18 to 60 nm especially 20 to 30 nmas this results in particularly good curing of the ink. Preferably 90% or more of the pigment particles are within 50% of the average particle size. By choosing particles of this size advantages can be achieved in terms of storage stability for the ink, cure speed and high optical density for the resultant prints. Pigment particle sizes outside these ranges may be used where printheads having particularly large nozzle diameters are used. Very fine dispersions of pigments and methods for their preparation are disclosed in, for example, EP 0 776 952, U.S. Pat. No. 5,538,548, U.S. Pat. No. 5,443,628, EP 0 259 130, U.S. Pat. No. 5,285, 064, EP 0 429 828 and EP 0 526 198.

For information, the primary particle size, BET surface area, DBP absorption and pH of various commercially available pigments are as follows:

| Supplier | Product Name | Primary Particle Size (nm) | BET surface Area (m$^2$/g) | DBP Absorption (ml/100 g) | Acid Value (mgNaOH/g pigment) |
| --- | --- | --- | --- | --- | --- |
| Degussa | S160 | 20 | 150 | 150 | 29.8 |
| Degussa | Special Black 4 | 25 | 180 | 110 | 27.8 |
| Degussa | Special Black 550 | 25 | 110 | 47 | 4.6 |
| Degussa | Special Black 350 | 31 | 65 | 45 | 4.4 |
| Degussa | Special Black 250 | 56 | 40 | 46 | 3.8 |

The amount of dispersant in the ink is preferably 0.1 to 10%, more preferably 0.3 to 8% and especially 0.5 to 6% by weight, relative to the total weight of the ink.

Preferred dispersants include those containing amine and/or imine groups, for example a polyester amine or imine, especially the reaction product of a poly(C$_{2-4}$-alkylene)imine with a polyester having a free carboxylic acid group, in which there are at least two polyester chains attached to each poly(C$_{2-4}$-alkylene)-imine chain. As dispersants the reaction products of poly(ethyleneimine) and/or polyalkylamine with ε-caprolactone and/or δ-valerolactone are especially preferred.

Suitable dispersants and their preparation are described in detail in U.S. Pat. No. 6,197,877, the disclosure of which is incorporated herein by reference thereto.

Examples of suitable dispersants include Solsperse™ 11000, Solsperse™ 32000; Solsperse™ 9000, (available from Avecia Limited) and P92-9590 (available from Sun Chemical).

The pigment and dispersant are preferably added to the ink as a mixture. For example, a mixture of a pigment and a dispersant may be made by milling pigment in a small amount of the liquid carrier with a milling media, e.g. glass beads. The pigment dispersion is then typically screened and "let down" by slowly adding the remaining liquid carrier.

The amount of liquid carrier in the ink is preferably 76 to 99.8%, more preferably 82 to 98.7% and especially 86 to 98.4% by weight, relative to the total weight of the ink.

Preferably the liquid carrier comprises a mixture of (meth)acrylate compounds, more preferably a mixture comprising one or more mono(meth)acrylate compounds, one or more di(meth)acrylate compounds and one or more compounds having three or more (meth)acrylate groups.

Mono (meth)acrylate compounds have one (and only one) acrylate or methacrylate group. This group is, as is known in the art, polymerisable when irradiated in the presence of a photo-initiator. (Meth)acrylate groups are represented by the formula:

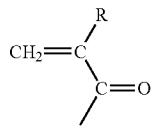

wherein R is H or methyl.

The mono(meth)acrylate compound is preferably a monomer. Examples of mono (meth)acrylate monomers include cyclic trimethylolpropane formal (meth)acrylate, ethoxylated tetra hydrofurfuryl(meth)acrylate, phenoxy ethyl(meth)acrylate, trimethylol propane formal (meth)acrylate, lauryl (meth)acrylate, stearyl(meth)acrylate, monomethoxy neopentyl glycol propoxylate mono(meth)acrylate, monomethoxy tripropylene glycol mono(meth)acrylate, 2-(2-ethoxyethoxy) ethyl(meth)acrylate, iso-decyl (meth)acrylate, iso-octyl(meth)acrylate, iso-nonyl(meth)acrylate, tridecyl (meth)acrylate, iso-bornyl(meth)acrylate, ethoxyl nonyl phenol (meth)acrylate, ethoxylated phenol (meth)acrylate, 2-hydroxylethyl(meth)acrylate, 4-hydroxyl butyl (meth)acrylate, 2-hydroxy propyl(meth)acrylate, iso-butyl(meth)acrylate, tert-butyl (meth)acrylate, cetyl(meth)acrylate, cyclohexyl(meth)acrylate, ethyl hexyl (meth)acrylate, 2-dimethyl amino ethyl(meth)acrylate, trifluoro ethyl(meth)acrylate, 3-methoxy butyl(meth)acrylate, dicyclopentenyl (meth)acrylate, polyethylene glycol mono (meth)acrylate and poly propylene glycol mono(meth)acrylate. Preferred mono (meth)acrylate monomers include lauryl(meth)acrylate, tetrahydro furfuryl(meth)acrylate, 2-(2-ethoxyethoxy) ethyl(meth)acrylate, iso-octyl(meth)acrylate, iso-decyl (meth)acrylate, tridecyl(meth)acrylate, dodecyl(meth)acrylate, isobornyl(meth)acrylate, cyclic trimethylol propane formal (meth)acrylate.

Di(meth)acrylate compounds have two (and only two) groups selected from acrylate and methacrylate.

Preferred di(meth)acrylate compounds are di(meth)acrylate monomers, for example di(meth)acrylates of 1,4-butane diol, 1-6-hexane diol, neopentyl glycol, mono, di, tri and poly ethylene glycols, mono, di, tri and poly propylene glycols, mono methoxy ethoxylated trimethylolpropane, propoxylated neopentyl glycol, ethoxylated neopentyl glycol, 1,2-butylene glycol and ethoxylated hexane diol.

The compound(s) having three or more (meth)acrylate groups have three or more groups selected from acrylate and methacrylate. The compound having three or more (meth)acrylate groups is preferably a monomer, oligomer or polymer, preferred examples of which include trimethylol propane tri(meth)acrylate, ethoxylated trimethylol propane tri(meth)acrylate, propoxylated trimethylol propane tri(meth)acrylate, glycerol tri(meth)acrylate, propoxylated glycerol tri(meth)acrylate, pentaerythritol tri(meth)acrylate, pentaerythritol tetra(meth)acrylate, tris(2-hydroxyethyl) isocyanurate triacrylate, ditrimethylol propane tetra(meth)acrylate, ethoxylated pentaerythritol tetra(meth)acrylate, ethoxylated di-pentaerylthritol tetra(meth)acrylate, tetra methylol methane tetra (meth)acrylate, multifunctional (meth)acrylate-urethanes, (meth)acrylate-polyesters and (meth)acrylate acrylics.

In view of the above preferences the carrier preferably comprises a mixture of:
  (a) 0 to 70 parts, more preferably 10 to 60 parts of mono (meth)acrylate compound(s);
  (b) 5 to 99.9 parts, more preferably 10 to 85 parts of di(meth)acrylate compound(s);
  (c) 0 to 70 parts, more preferably 5 to 50 parts of compound(s) having three or more (meth)acrylate groups; and
  (d) 0.1 to 15 parts, more preferably 4 to 12 parts of photoinitiator(s);

wherein all parts are by weight and the number of parts (a)+(b)+(c)+(d) add up to 100.

Preferred photoinitiators include alpha diketones, monoketals of alpha-diketones or ketoaldehydes, acyloins and their corresponding ethers, chromophore-substituted halo-s-triazines, and chromophore-substituted halomethyl-oxadiozoles. Specific examples of photoinitiators include acetophenone, propiophenone, 2-phenyl-acetophenone, 2-chloro-2-phenyl-acetophenone, 2-2-dichloro-2-phenyl-acetophenone, 2-butoxy-2-phenyl acetophenone, 2,2-dimethoxy-2-phenyl-acetophenone, 2,2-diethoxy-acetophenone, 2-methylol-2-methoxy-2-phenyl-acetophenone, benzophenone, 4-trichloromethyl benzophenone, indenone, 1-3-indanedione, fluorenone, xanthone, thioxanthone, 2-chlorothioxanthone, anthraquinone, 2-ethylanthraquinone, biacetyl, glyoxal, 1,2-indanedione, p-chlorophenyl-glyoxal, benzil, camphoquinone, and benzoin methyl and ethyl esters. The ink optionally further contains one or more co-initiators or amine synergists in order to improve cure rate. Examples include isopropylthioxanthone, ethyl-4-(dimethylamine) benzoate, 2-ethyl hexyl dimethylaminobenzoate and dimethylaminoethyl methacrylate. Preferably the photoinitiator is other than a cationic photoinitiator. Commercial photoinitiators particularly suitable for use in the present invention include Speedcure™ ITX Speedcure™ EHA, and Irgacure™ 369.

Preferably the photoinitiator is soluble in the carrier.

A single photoinitiator may be used although it is preferable the photoinitiator is a mixture of two or more photoinitiators because this can lead to a broader spectral response improved depth of cure and improved cure rate with opacifying pigments such as carbon black.

Preferably the carrier further comprises a stabiliser to improve the storage stability of the ink and prevent premature curing. The stabiliser is preferably an antioxidant, a radical trap, a radical quencher or the like, e.g. a phenol, thiol, quinone, hydroquinone, amine, xanthate or an N-alkyl or N-aryl anilines. Too much stabiliser will prevent cure entirely. Hence preferred amounts of stabiliser are 0 to 10 parts, more preferably 0.01 to 5 parts, and especially 0.1 to 3 parts by weight relative to the total number of parts of carrier. Mixtures of stabilisers are preferable for the best ink storage lifetime.

Preferably the ink is curable by actinic radiation or particle beams, especially by ultraviolet light or electron beam radiation.

Optionally the carrier further comprises a polymer or oligomer containing no (meth)acrylate groups, e.g. one or more vinyl ethers and/or styrene. Preferably the polymer and oligomer containing no (meth)acrylate groups is present in the ink at from 0 to 15 parts, more preferably 0 to 10 parts and most preferably 0 to 5 parts by weight relative to the total weight of the carrier.

Preferably inks of the present invention are substantially solvent free. That is to say no solvent or water is present in the ink except for trace amounts which may be present as impurities in any of the ink components. Preferably any such residues are less than 2%, more preferably less than 0.5% and especially less than 0.01% by weight relative to the total weight of ink.

The viscosity of the inks of the present invention is preferably 1 to 30 mPa·s, more preferably from 2 to 25 mPa·s, at 60° C. The ink composition may optionally have a higher viscosity at room temperature provided that the final ink meets the above viscosity requirements at the above temperature.

The surface tension of the ink of the present invention is preferably below dynes/cm.

Inks of the present invention are preferably free from particles that would block an ink jet nozzle. To achieve this the ink may be filtered through a filter with a pore size of less than 10 μm, more preferably less than 3 μm and especially less than 1 μm.

Bearing in mind the above preferences, a particularly preferred ink according to the invention is a non-aqueous, substantially solvent-free radiation curable ink having a viscosity of 1 to 30 m Pa·s at 60° C. comprising:
- (i) 1 to 10% of one or more pigments having an acid value in the range 12 to 40 mg of NaOH per gram of pigment, a BET surface Area of 100 to 250 m$^2$/g and a DBP absorption of 80 to 150 ml/100 g;
- (ii) 0.5 to 6% of one or more dispersants having amine and/or imine groups; and
- (iii) the balance to 100% being a liquid carrier;

wherein all % are by weight and the liquid carrier comprises a mixture of:
- (a) 0 to 70 parts, more preferably 10 to 60 parts of one or more mono (meth)acrylate compound(s) selected from the group consisting of cyclic trimethylolpropane formal (meth)acrylate, ethoxylated tetra hydrofurfuryl (meth)acrylate, phenoxy ethyl(meth)acrylate, trimethylol propane formal (meth)acrylate, lauryl(meth)acrylate, stearyl(meth)acrylate, monomethoxy neopentyl glycol propoxylate mono(meth)acrylate, monomethoxy tripropylene glycol mono(meth)acrylate, 2-(2-ethoxyethoxy) ethyl (meth)acrylate, iso-decyl(meth)acrylate, iso-octyl(meth)acrylate, iso-nonyl (meth)acrylate, tridecyl(meth)acrylate, iso-bornyl(meth)acrylate, ethoxyl nonyl phenol (meth)acrylate, ethoxylated phenol (meth)acrylate, 2-hydroxyl ethyl(meth)acrylate, 4-hydroxyl butyl(meth)acrylate, 2-hydroxy propyl (meth)acrylate, iso-butyl(meth)acrylate, tert-butyl (meth)acrylate, cetyl (meth)acrylate, cyclohexyl(meth) acrylate, ethyl hexyl(meth)acrylate, 2-dimethyl amino ethyl(meth)acrylate, trifluoro ethyl(meth)acrylate, 3-methoxy butyl(meth)acrylate, dicyclopentenyl(meth) acrylate, polyethylene glycol mono(meth)acrylate and poly propylene glycol mono(meth)acrylate and mixtures thereof;
- (b) 5 to 99.9 parts, more preferably 10 to 85 parts of one or more di (meth)acrylate compound(s) selected from the group consisting of di(meth)acrylates of 1,4-butane diol, 1,6-hexane diol, neopentyl glycol, mono, di, tri and poly ethylene glycols, mono, di, tri and poly propylene glycols, mono methoxy ethoxylated trimethylolpropane, propoxylated neopentyl glycol, ethoxylated neopentyl glycol, 1,2-butylene glycol and ethoxylated hexane diol and mixtures thereof;
- (c) 0 to 70 parts, more preferably 5 to 50 parts of one or more compound(s) having three or more (meth)acrylate groups selected from the group consisting of trimethylol propane tri(meth)acrylate, ethoxylated trimethylol propane tri(meth)acrylate, propoxylated trimethylol propane tri(meth)acrylate, glycerol tri(meth)acrylate, propoxylated glycerol tri(meth)acrylate, pentaerythritol tri (meth)acrylate, pentaerythritol tetra(meth)acrylate, tris (2-hydroxyethyl) isocyanurate triacrylate, ditrimethylol propane tetra(meth)acrylate, ethoxylated pentaerythritol tetra(meth)acrylate, ethoxylated di-pentaerylthritol tetra(meth)acrylate, tetra methylol methane tetra(meth) acrylate, multifunctional (meth)acrylate-urethanes, (meth)acrylate-polyesters and (meth)acrylate acrylics and mixtures thereof; and
- (d) 0.1 to 15 parts, more preferably 2 to 13 parts, especially 4 to 12 parts of one or more photoinitiator(s);

wherein all parts are by weight and the number of parts (a)+(b)+(c)+(d) add up to 100.

The liquid carrier may of course contain further components in addition to components (a) to (d) specified above, for example preservatives, biocides, rheology modifiers, surfactants, levelling agents, antifoaming agents, anti-kogation agents and combinations thereof. The requirement for the number of parts (a)+(b)+(c)+(d) add up to 100 is merely intended to define the ratio of these components relative to one another in the liquid.

In this preferred ink the one or more mono(meth)acrylate compounds consists of a mixture of isobornyl acrylate; the one or more di(meth)acrylate compounds aretripropylene glycol diacrylate and dipropylene glycol diacrylate; mixture of one or more compound having three or more (meth)acrylate groups is trimethyolpropane triacrylate and (ethoxylated)$_3$ trimethyolpropane triacrylate. Preferably the pigment is a carbon black pigment having a pH in below 7. Such carbon blacks are commercially available and are often manufactured by oxidising a neutral carbon black during routine manufacture (for example gas black manufacture where oxygen has been introduced into the gas stream).

In contrast to conventional ink jet printing inks, the inks of the present invention possess several potential advantages. They can be formulated completely free from solvent, making them substantially more environmentally friendly than conventional solvent-based inks in which considerable amounts of solvent are emitted into the atmosphere. When ink jet printing non-absorbing substrates, e.g. metals and plastics, the speed of printing for the present inks can be much greater than for the conventional aqueous and solvent-based inks resulting in greater productivity.

Compared to conventional ink jet printing inks, the inks of the present invention have several industrial printing advantages in regard to the quality of the printing and reduced tendency to block the fine nozzles typically used in ink jet printers.

According to a second aspect of the present invention there is provided a process for printing an image onto a substrate comprising applying thereto an ink according to the first aspect of the present invention by means of an ink jet printer and curing the ink, preferably using an electron beam or more preferably using ultra violet light. Printed substrates obtained by this process form a further feature of the present invention.

Preferred substrates are metal, plastic, ceramic, glass, wood and papers. Preferred applications include printing for home/office use, packaging, labelling and barcodes, particularly wide format graphics, signage, wall coverings and decorative laminates.

According to a third aspect of the present invention there is provided an ink jet printer cartridge comprising a chamber and an ink wherein the ink is present in the chamber and is as defined in the first aspect of the invention.

The invention in further illustrated by the following examples in which all parts and percentages are by weight unless otherwise stated.

EXAMPLE 1 AND COMPARATIVE EXAMPLES C1, C2 AND C3

The procedure for preparing all inks described in Table 1 was as follows:

Preparation of Millbases

Millbases were prepared by bead milling the pigment with approximately 60% of the Sartomer 306 described in the Example together with all the Solsperse™ dispersant(s) indicated in Table 2 until a fine particle dispersion was formed.

Preparation of Inks

The remaining components indicated in Table 1 for each ink were then added to the millbases in the dark and the mixture was homogenised and then filtered through 3 μm and 1 μm Pall Profile II 1" cartridge segments.

Results

The inks described in Table 1 (Example 1 and Comparative Examples C1 to C3) were tested for jetting performance in a Toshiba TEC grey scale print head controlled by a Kensa PCB board. The print testing was carried out using the following procedure. First, the print head thoroughly was purged with ink to remove air bubbles. The heating system was adjusted to achieve a constant jetting temperature of 45° C. Then the print head drive voltage was adjusted (ca. 20-25 volts) such that the head is firing 42 pl drops drop volume for each head. Next the print head was operated for 5 minutes and the number of nozzles lost after five minutes was recorded. At the end of the 5 minute print test the head was cleaned and the 5 minute print test was repeated. This test was performed 12 times in total for each ink and the total number of nozzles "lost" (i.e. the total number of nozzles which stopped working) during the 12 tests was recorded in Table 2.

TABLE 1

| Ingredient Commercial name | Technical Description | Comparative Example C1 % | Comparative Example C2 wt % | Comparative Example C3 wt % | Example 1 wt % |
|---|---|---|---|---|---|
| Regal 250R ™ | Carbon Black pigment (AV 0) | 2.50 | — | — | — |
| Special Black 250 ™ | Carbon Black pigment (AV 3.80) | — | 2.50 | — | — |
| Special Black 350 ™ | Carbon Black pigment (AV 4.4) | — | — | 2.50 | — |
| Special Black 4 ™ | Carbon Black pigment (AV 27.8) | — | — | — | 2.50 |
| Solsperse ™ 32000 | Dispersant having amino/imino groups | 1.56 | 0.60 | 0.80 | 0.94 |
| Solsperse ™ 5000 | Dispersant | 0.09 | 0.00 | 0.00 | 0 |
| Sartomer ™ 506 | Isobornyl acrylate | 36.55 | 37.40 | 37.20 | 36.35 |
| Actilane ™ 422 | dipropyleneglycol diacryalte | 18.00 | 18.00 | 18.00 | 18.00 |
| Sartomer ™ 306 | tripropyleneglycol diacrylate | 11.50 | 11.50 | 11.50 | 12.21 |
| Actilane ™ 430 | Ethoxylated trimethylolpropane triacrylate | 10.00 | 10.00 | 10.00 | 10.00 |
| Actilane ™ 251 | Urethane triacrylate oligomer | 10.00 | 10.00 | 10.00 | 10.00 |
| Irgacure ™ 369 | Photo-initiator | 4 | 4 | 4 | 4 |
| Speedcure ™ EHA | Amine Synergist | 4 | 4 | 4 | 4 |
| Speedcure ™ ITX | Photo-initiator | 2 | 2 | 2 | 2 |

TABLE 2

| Example | Carbon Black | pH | Acid Value. (mgNaOH/g pigment) | Primary particle size (nm) | BET ($m^2/g$) | DBP | Ink jetting Total No. of lost nozzles |
|---|---|---|---|---|---|---|---|
| C1 | Regal 250R ™ | 7.75 | 0 | 34 | 55 | | 5 |
| C2 | Special Black 250 ™ | 3.95 | 3.8 | 56 | 40 | | 4 |
| C3 | Special Black 350 ™ | 4.16 | 4.4 | 31 | 65 | | 12 |
| 1 | Special Black 4 ™ | 2.88 | 27.8 | 25 | 180 | 110 | 0 |

The above table shows that the ink of Example 1 has better jetting reliability than any of the Comparative Examples (C1, C2 and C3).

The invention claimed is:

1. A non-aqueous, radiation-curable ink comprising pigment, dispersant and a liquid carrier, wherein the pigment has an acid value greater than 8 mg of NaOH per gram of pigment.

2. An ink according to claim 1 having a viscosity of 1 to 30 mPa·s at 60° C.

3. An ink according to claim 1 or claim 2 wherein the dispersant contains amine and/or imine groups.

4. An ink according to claim 1 or claim 2 wherein the pigment is carbon black pigment having a BET surface area of 50 to 400 m2/g.

5. An ink according to claim 1 or claim 2 wherein the pigment having DBP absorption of 50 to 200 ml/100 g.

6. An ink according to claim 1 or claim 2 wherein the pigment has a pH below 7.

7. An ink according to claim 1 which is substantially solvent-free.

8. An ink according to claim 1 or claim 2 wherein the carrier comprises a mixture comprising one or more mono(meth)acrylate compounds, one or more di(meth)acrylate compounds and one or more compounds having three or more (meth)acrylate groups.

9. An ink according to claim 1 or claim 2 wherein the carrier comprises a mixture of:
 (a) 0 to 70 parts of mono(meth)acrylate compound(s);
 (b) 5 to 99.9 parts of di(meth)acrylate compound(s);
 (c) 0 to 70 parts of compound(s) having three or more (meth)acrylate groups; and
 (d) 0.1 to 15 parts of photoinitiator(s);
wherein all parts are by weight and the number of parts (a)+(b)+(c)+(d) add up to 100.

10. An ink according to claim 1 which has a viscosity of 1 to 30 mPa·s at 60° C., wherein the dispersant contains amine and/or imine groups, the pigment is carbon black pigment having a BET surface area of 50 to 400 $m^2/g$ and a DBP absorption of 50 to 200 ml/100 g and the ink is substantially solvent-free.

11. A non-aqueous, substantially solvent-free radiation curable ink comprising pigment, dispersant and liquid carrier, said ink having a viscosity of 1 to 30 m Pa·s at 60° C. and comprising:
 (i) 1 to 10% of one or more pigments having an acid value in the range 12 to 40 mg of NaOH per gram of pigment, a BET surface Area of 100 to 250 $m^2/g$ and a DBP absorption of 80 to 150 ml/100 g;
 (ii) 0.5 to 6% of one or more dispersants having amine and/or imine groups; and
 (iii) the balance to 100% being a liquid carrier;
wherein all % are by weight and the liquid carrier comprises a mixture of:
 (a) 0 to 70 parts of one or more mono(meth)acrylate compound(s) selected from the group consisting of cyclic trimethylolpropane formal (meth)acrylate, ethoxylated tetra hydrofurfuryl(meth)acrylate, phenoxy ethyl(meth) acrylate, trimethylol propane formal (meth)acrylate, lauryl(meth)acrylate, stearyl(meth)acrylate, monomethoxy neopentyl glycol propoxylate mono (meth)acrylate, monomethoxy tripropylene glycol mono(meth)acrylate, 2-(2-ethoxyethoxy)ethyl(meth) acrylate, iso-decyl(meth)acrylate, iso-octyl(meth)acrylate, iso-nonyl(meth)acrylate, tridecyl(meth)acrylate, iso-bornyl(meth)acrylate, ethoxyl nonyl phenol(meth) acrylate, ethoxylated phenol (meth)acrylate, 2-hydroxyl ethyl(meth)acrylate, 4-hydroxyl butyl(meth)acrylate, 2-hydroxy propyl(meth)acrylate, iso-butyl(meth)acrylate, tert-butyl(meth)acrylate, cetyl(meth)acrylate, cyclohexyl(meth)acrylate, ethyl hexyl(meth)acrylate, 2-dimethyl amino ethyl(meth)acrylate, trifluoro ethyl (meth)acrylate, 3-methoxy butyl(meth)acrylate, dicyclopentenyl(meth)acrylate, polyethylene glycol mono (meth)acrylate and poly propylene glycol mono(meth) acrylate and mixtures thereof;
 (b) 5 to 99.9 parts of one or more di(meth)acrylate compound(s) selected from the group consisting of di(meth) acrylates of 1,4-butane diol, 1,6-hexane diol, neopentyl glycol, mono, di, tri and poly ethylene glycols, mono, di, tri and poly propylene glycols, mono methoxy ethoxylated trimethylolpropane, propoxylated neopentyl glycol, ethoxylated neopentyl glycol, 1,2-butylene glycol and ethoxylated hexane dial and mixtures thereof; and
 (c) 0 to 70 parts of one or more compound(s) having three or more (meth)acrylate groups selected from the group consisting of trimethylol propane tri(meth)acrylate, ethoxylated trimethylol propane tri(meth)acrylate, propoxylated trimethylol propane tri(meth)acrylate, glycerol tri(meth)acrylate, propoxylated glycerol tri(meth) acrylate, pentaerythritol tri(meth)acrylate, pentaerythritol tetra(meth)acrylate, tris(2-hydroxyethyl) isocyanurate triacrylate, ditrimethylol propane tetra(meth)acrylate, ethoxylated pentaerythritol tetra (meth)acrylate, ethoxylated di-pentaerylthritol tetra (meth)acrylate, tetra methylol methane tetra(meth)acrylate, multifunctional (meth)acrylate-urethanes, (meth)acrylate-polyesters and (meth)acrylate acrylics and mixtures thereof; and (d) 0.1 to 15 parts of one or more photoinitiator(s);

wherein all parts are by weight and the number of parts (a)+(b)+(c)+(d) add up to 100.

12. An ink according to claim 11 wherein component (a) is present in an amount of 10 to 60 parts, component (b) is present in an amount of 10 to 85 parts and component (c) is present in an amount of 5 to 50 parts.

13. A process for printing an image onto a substrate comprising applying thereto an ink according to claim 1 or claim 2 by means of an ink jet printer and curing the ink.

14. An ink jet printer cartridge comprising a chamber and an ink wherein the ink is present in the chamber and is as defined in claim 1 or claim 2.

* * * * *